United States Patent Office 3,538,572
Patented Nov. 10, 1970

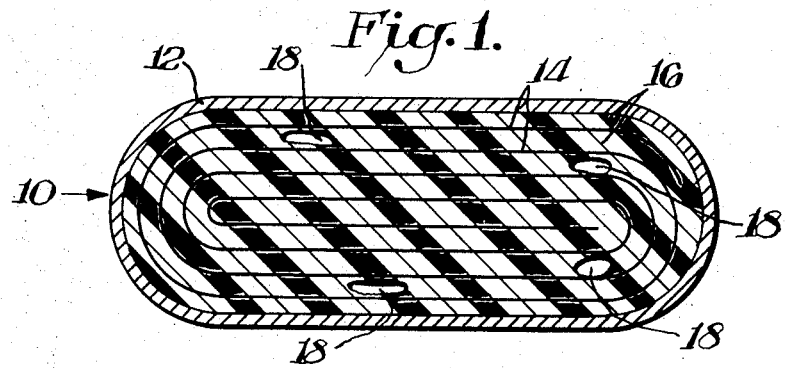
Fig. 1.
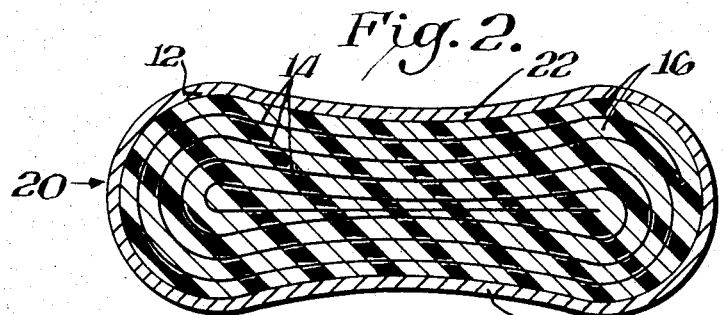
Fig. 2.
Fig. 3.
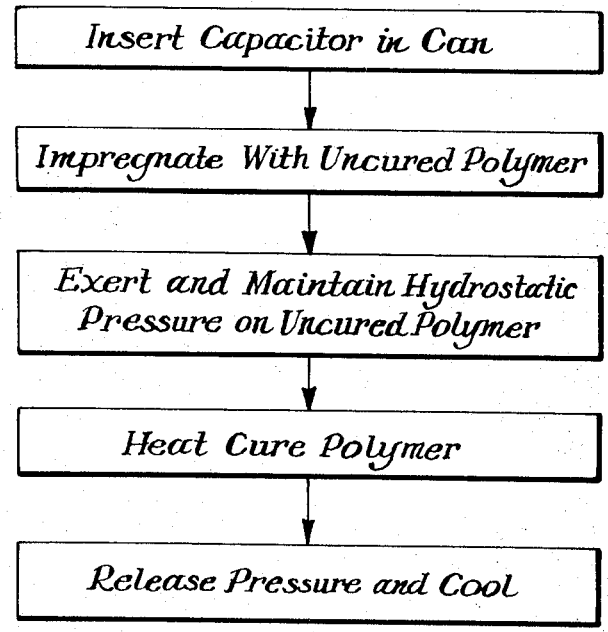

3,538,572
PROCESS OF MAKING AN IMPREGNATED CAPACITOR
Roger E. Lull, Williamstown, Mass., assignor to Sprague Electric Company, North Adams, Mass., a corporation of Massachusetts
Filed Sept. 16, 1968, Ser. No. 762,249
Int. Cl. H01g 3/195
U.S. Cl. 29—25.42          1 Claim

ABSTRACT OF THE DISCLOSURE

A capacitor section located in a capacitor can, is one which has been vacuum impregnated with a resin which has been cured while under hydrostatic pressure. The resin is therefore characterized by hydrostatic pressure-eliminated voids, fissures and gas bubbles. The process involves subjecting the impregnated unit to hydrostatic pressure prior to and during heat curing of the resin.

BACKGROUND OF THE INVENTION

This invention relates to resin impregnated electrical capacitors.

A persistent problem in association with a resin-impregnated, capacitor section is the presence of internal cracks, dislocations, interfacial gas films, voids, etc. The presence of these imperfections result in a lowering of the corona starting voltage and possible breakdown of the capacitor at these sites of comparatively low dielectric strength. One prior art procedure for coping with this problem involved impregnating the capacitor section with an uncured resin and, after impregnation, the unit was placed in a mechanical pressure device and squeezed together forcefully in an attempt to eliminate any air or gas bubbles that may be present. While the unit or units were thus held under pressure, heat was applied to accelerate polymerization or setting of the resin. After the units were cooled to room temperature they were then housed in a moisture tight casing or coating. It is believed that this prior art process does not completely eliminate the problem of gas bubbles or voids. There is reason to believe that some of the voids or bubbles become physically trapped at the interface between two layers in the section.

It is an object of the present invention to eliminate the voids, fissures, gas bubbles, etc. in a resin-impregnated capacitor.

It is a further object of the invention to present a novel resin-impregnated capacitor unit.

The above and further objects and novel features of the invention will more fully appear from the following detailed description.

SUMMARY OF THE INVENTION

The process of the present invention involves vacuum impregnating a capacitor section which is housed in a capacitor can, with a catalyzed but uncured resin system. The impregnated unit is submerged in a fluid system having temperature and hydrostatic pressure control means. The unit is subjected to a hydrostatic pressure sufficient to at least minimize internal cracks, dislocations, gas regions or voids that tend to form during curing of the resin. While the pressure is maintained on the unit, it is heated to effect complete curing of the resin. The pressure may be exerted on a unit which is either hermetically sealed in a can or on a unit which is in an open end can or a can with an open fillhole. If hermetically sealed, the can must have pressure yieldable sides so that the hydrostatic pressure can be exerted on the curing resin.

Unlike prior art pressure techniques which merely displace bubbles, the hydrostatic pressure employed in the process of the present invention eliminates or at least greatly inhibits the formation of voids and bubbles.

The capacitor unit of the present invention comprises a capacitor section in a capacitor can, said section being impregnated with an in situ-cured resin, said resin being characterized by hydrostatic pressure-eliminated voids, fissures and gas bubbles. In a preferred unit the capacitor is a convolutely wound section hermetically sealed in a capacitor can, said can being characterized by having hydrostatic pressure-concaved major wall areas.

BRIEF DESCRIPTION OF THE DRAWING

FIG. 1 is a plan view of a section through a polymer-impregnated capacitor in a can;

FIG. 2 is a plan view of a section through a polymer-impregnated capacitor in a can, said can having pressure-concaved wall areas in accordance with the present invention; and FIG. 3 is a flow sheet of the process of the present invention.

In FIG. 1, 10 depicts a plan view of a section through a polymer-impregnated capacitor, hermetically sealed in a can. Metal can 12 houses a capacitor unit 14 which is impregnated with a cured resin 16. Within the windings of capacitor 14 there is shown a number of gas bubbles or voids 18. In FIG. 2, 20 depicts a plan view of a section through a polymer-impregnated capacitor in a can. The walls of metal can 12 are shown to be somewhat concave at 22 due to the fact that the polymer 16 had been subjected to pressure before and during the curing of said polymer 16. FIG. 3 shows a flow sheet of the several process steps of the present invention.

DETAILED DESCRIPTION OF THE INVENTION

Example

A hermetically sealed polymer-impregnated capacitor of the present invention is formed as follows: Two ¼ mil aluminum foils 4 inches in width are separated by two layers of three sheets each of 1½ mil reconstituted mica paper. The width of the mica paper is such that there is a ½ inch margin beyond the edge of each of the foils. The capacitor section is wound so as to form a 1.25 microfarad, 6 kilovolt section. Two pieces of tab stock are appropriately located in the winding so as to contact each of the aluminum foils. The capacitor unit is inserted into a steel can of oval cross section and the electrode tabs are electrically connected terminals in a can cover which is sealed to the top of the can. An open fill hole is located in the top of the can cover. The unit is vacuum dried for approximately 72 hours at 150° C. The unit is vacuum impregnated with a mixture of furane 203A and furane 203B containing an organic acid anhydride curing agent. This is a commercially available organic epoxy resin. The fill hole of the can is then sealed with solder. The unit is solvent cleaned and inserted in an autoclave having both hydrostatic pressure and temperature control means. The autoclave is filled with mineral oil and the sealed capacitor is subjected to 50 atmospheres of hydrostatic pressure. The system is then heated to promote the curing of the polymer. Heating is continued until the polymer is completely cured. The unit is then removed from the pressure system, cooled, cleaned and tested.

A companion unit for comparison purposes prepared under exactly the same conditions as those of the preceding example but not subjected to pressure prior to and during the curing of the polymer, will, under testing, be shown to have a considerably lower corona start voltage than the unit of the example.

In the foregoing example the capacitor can was hermetically sealed prior to subjection of the unit to hydrostatic pressure. Since the unit was sealed, it must have pressure-yieldable walls in order to transmit the hydrostatic pressure to the polymer prior to and during curing. It is to be understood, however, that the can need not be sealed prior to exertion of the pressure. The can holding the impregnated unit may be an open ended can or there may be an open fill hole in the cover of the can. When this is the case, the unit is completely submerged in the hydrostatic pressure-transmitting fluid. The fluid selected, e.g. mineral oil, is not a solvent for the polymer and thus no damage is done by the fluid coming in contact therewith. Imperfections are eliminated or prevented from forming in the cured polymer by the exertion of pressure through the fluid on the curing polymer.

If the technique of the present invention is not employed during the polymerization of the uncured resin, certain voids, gas bubbles and fissures occur in the system and these imperfections will be sites of low dielectric strength and low dielectric constant which will tend to promote a low corona start voltage condition. By subjecting the uncured polymer to high pressure prior to and during the curing of the polymer, any voids or gas bubbles and fissures which tend to form are inhibited in their formation or minimized to a large extent, while the resin is curing to the hard state. FIG. 2 of the drawing shows the side walls of the can concaved to an exaggerated degree. Actually the walls will concave to quite a small extent but sufficient to transmit hydrostatic pressure on any gas or voids that form.

The present invention is not limited to any particular type of capacitor. It may be a convolutely wound or a stacked capacitor. The foils can be metals other than aluminum such as copper, lead-tin alloy, etc. The dielectric can be other than reconstituted mica paper, such as mica, kraft paper, Benares paper, etc. The impregnating polymer can be any of the prior art heat-settable or thermo set resins and can be comparatively radiation resistant. Examples of preferred resins are epoxies, silicones, polyesters, etc.

Specific examples of prior art resins are N-vinyl carbazole containing 0.5% benzoyl peroxide; 98% styrene and 2% p-divinyl benzene; 2,3,4,5,6-pentachlorostyrene; 90% ethylene glycol fumerate, 9% styrene and 1% tert-butyl hydroperoxide; vinyl dibenzofuran plus 0.3% acetyl peroxide; etc.

When the unit is to be sealed prior to the exertion of pressure, the capacitor can or container of the present invention may be made of various materials but it must yield at least to some small extent so that the hydrostatic pressure will be transmitted to any voids, bubbles or fissures which may tend to form during the curing of the polymer. The pressure-transmitting fluid can be any prior art fluid which is a nonsolvent for the polymer selected.

While the present invention has been described with reference to particular embodiments thereof, it will be understood that numerous modifications may be made by those skilled in the art without actually departing from the scope of the invention. Therefore, the appended claim is intended to cover all such equivalent variations as come within the true spirit and scope of the foregoing disclosure.

What is claimed is:
1. A method of forming a capacitor comprising:
 (a) placing a convolutely wound capacitor section in a capacitor can, said can having pressure-yieldable sides;
 (b) vacuum impregnating said section with a catalyzed but uncured polymer system;
 (c) hermetically sealing the unit;
 (d) submerging the unit in a fluid system having temperature and hydrostatic control means;
 (e) subjecting the submerged unit to hydrostatic pressure sufficient to cause said sides to yield, thereby transmitting pressure to the inside of said unit; and
 (f) while maintaining said pressure, heating the unit to completely cure the polymer, said pressure being sufficient to at least minimize internal cracks, dislocations, gas regions or voids in the cured polymer.

References Cited
UNITED STATES PATENTS

| | | | |
|---|---|---|---|
| 2,864,982 | 12/1958 | Ruscetta | 317—258 |
| 2,951,002 | 8/1960 | Ruscito | 317—258 X |
| 3,299,333 | 1/1967 | Rayno | 317—260 |
| 2,970,936 | 2/1961 | Richardson | 174—120 X |

ELLIOT A. GOLDBERG, Primary Examiner

U.S. Cl. X.R.

317—260